(12) United States Patent
Shiga et al.

(10) Patent No.: US 8,135,870 B2
(45) Date of Patent: Mar. 13, 2012

(54) INFORMATION PROCESSING APPARATUS AND INFORMATION PROCESSING METHOD

(75) Inventors: Teiichi Shiga, Chiba (JP); Toshinori Kanemoto, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 13/183,159

(22) Filed: Jul. 14, 2011

(65) Prior Publication Data

US 2011/0271015 A1   Nov. 3, 2011

Related U.S. Application Data

(63) Continuation of application No. 12/468,509, filed on May 19, 2009.

(30) Foreign Application Priority Data

May 20, 2008   (JP) .................................. 2008-131824

(51) Int. Cl.
*G06F 3/00*   (2006.01)
(52) U.S. Cl. .................................. 710/5; 710/52; 710/53
(58) Field of Classification Search .................. None
See application file for complete search history.

(56) References Cited

U.S. PATENT DOCUMENTS

| | | | |
|---|---|---|---|
| 6,011,921 A | 1/2000 | Takahashi et al. | |
| 7,171,401 B2 | 1/2007 | Tanaka | |
| 7,623,513 B2 * | 11/2009 | Gobara et al. | 370/389 |
| 7,765,590 B2 | 7/2010 | Thomas et al. | |
| 2001/0041587 A1 | 11/2001 | Gushiken | |
| 2001/0047439 A1 | 11/2001 | Daniel et al. | |
| 2008/0054851 A1 | 3/2008 | Nozawa | |
| 2009/0043776 A1 | 2/2009 | Moshayedi | |
| 2009/0254779 A1 | 10/2009 | Ushio et al. | |

FOREIGN PATENT DOCUMENTS

| | | |
|---|---|---|
| JP | 3076212 | 6/2000 |
| JP | 2000-341763 | 12/2000 |
| JP | 2002-247157 | 8/2002 |
| JP | 2002-345037 | 11/2002 |
| JP | 2004-129129 | 4/2004 |
| JP | 2006-005497 | 1/2006 |

(Continued)

OTHER PUBLICATIONS

Abrial et al., "A New Contactless Smart Card IC Using an On-Chip Antenna and an Asynchronous Microcontroller", Journal of Solid-State Circuits, Jul. 2001, pp. 1101-1107, vol. 36.

(Continued)

*Primary Examiner* — Eron J Sorrell
(74) *Attorney, Agent, or Firm* — K&L Gates LLP

(57) ABSTRACT

An information processing apparatus includes a communication processing unit configured to communicate with an external communication device and a data processing unit configured to communicate with the communication processing unit via a wired data communication path. The data processing unit is configured to interpret address information received from the external communication device. The communication processing unit includes a memory where data transmitted and received between the external communication device and the data processing unit is temporarily stored. The communication processing unit further includes a control unit configured to control data writing in and data reading from the memory, perform an error check process by a code included in a received data from the external communication device, and transmit the address information received from the external communication device to the data processing unit without interpreting the address information.

14 Claims, 7 Drawing Sheets

FOREIGN PATENT DOCUMENTS

| | | |
|---|---|---|
| JP | 2006-108886 | 4/2006 |
| JP | 2007-199895 | 8/2007 |

OTHER PUBLICATIONS

European Office Action dated Dec. 16, 2010, for corresponding European Patent Appln. No. 09006730.7.

Japanese Office Action issued on Jun. 15, 2010, for corresponding Japanese Patent Appln. No. 2008-131824.

European Patent Office, Extended European Search Report, issued in connection with European Patent Application No. 11003713.2, mailed on Oct. 17, 2011 (7 pages).

"Universal Serial Bus Specifcation Revision 2.0," Document No. XP-002623286, dated Apr. 27, 2010. (87 pages).

* cited by examiner

FIG. 6

| HEADER | COMMAND | ADDRESS 0 | DATA 0 | ADDRESS 1 | DATA 1 | ... | FOOTER |

FIG. 7
(a) WRITING REQUEST PACKET
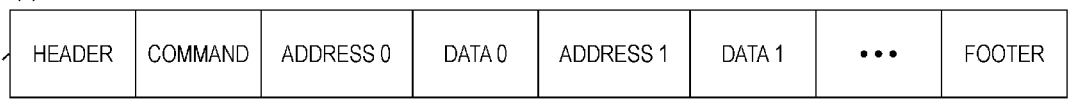
(b) PROCESSING EXAMPLE OF DATA WRITING IN MEMORY
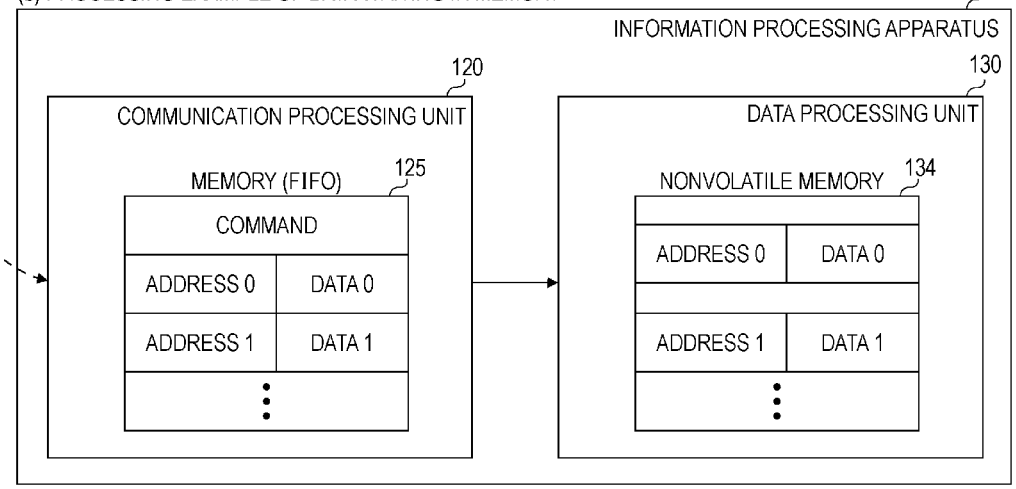

INFORMATION PROCESSING APPARATUS AND INFORMATION PROCESSING METHOD

CROSS REFERENCES TO RELATED APPLICATIONS

The present application is a continuation of U.S. patent application Ser. No. 12/468,509, filed on May 19, 2009, which claims priority to Japanese Priority Patent Application JP 2008-131824 filed in the Japan Patent Office on May 20, 2008, the entire content of which is hereby incorporated by reference.

BACKGROUND

The present application relates to an information processing apparatus, an information processing system, a method of processing information, and a computer program. More specifically, the present application relates to an information processing apparatus, an information processing system, a method of processing information, and a computer program, which are configured to carry out communication processing and data processing associated with the communication processing.

IC cards having IC circuits and antennas that enable contactless communication and mobile terminals having the function of IC cards are used in various fields. An IC card is capable of contact or contactless wireless communication with a reader/writer. For example, data is transferred wirelessly between an IC card and a reader/writer to carry out data reading and writing at various devices. The processing carried out between an IC card and a reader/writer is described in, for example, Japanese Unexamined Patent Application Publication No. 2006-108886.

For example, processing such as that described in the following is carried out in communication between an IC card and a reader/writer.

The reader/writer outputs a command packet (processing request) to the IC card.

The IC card receives the command packet and carries out processing corresponding to the command.

The IC card sends back a response packet after carrying out the processing.

Such processing described above is carried out.

As apparatuses having an IC card function, there are, for example, mobile phones.

Such as the mobile phone device described above, when an IC card function according to the related art is installed in electronic equipment, the electronic equipment is provided with wireless communication interface for carrying out contactless communication with the reader/writer; a CPU for carrying out protocol processing for the contactless communication and processing data associated with communication; a memory used as a work area of the CPU; and a IC chip constituting a subsystem including a wire communication interface for transmitted communication data to the electronic equipment via the wireless interface and receiving data from the electronic equipment.

More specifically, for example, the configuration illustrated in FIG. 1 may be used. FIG. 1 illustrates an information processing apparatus 10, which is electronic equipment, and a reader/writer 1. The information processing apparatus 10 includes a communication processing unit 20 that provides an IC card function and an apparatus main body 30. The communication processing unit 20 is a subsystem that carries out contactless communication with the reader/writer 1. The apparatus main body 30 carries out data processing in response to the function of the information processing apparatus 10.

The communication processing unit 20 includes an antenna 21 for carrying out wireless communication with the reader/writer 1; a wireless communication interface 22; a CPU 23 for controlling processes carried out in the communication processing unit 20; a wire communication interface 24 for carrying out wire communication with the apparatus main body 30; a program memory 25 where execution programs and parameters for the CPU 23 are stored; a nonvolatile memory 26 where communication data is stored; and a RAM 27 that is a memory used as a work area for processing carrying out by the CPU 23.

The apparatus main body 30 includes a wire communication interface 31 for carrying out wire communication with the communication processing unit 20; a CPU 32 for controlling processes carried out in the apparatus main body 30; a program memory 33 where execution programs and parameters for the CPU 32 are stored; a nonvolatile memory 34 where various data that is to be saved even when power is turned off is stored; and a RAM 35 that is a memory used as a work area for processing carrying out by the CPU 32.

The configuration illustrated in FIG. 1 enables the addition of the IC card function to various types of electronic equipment, such as mobile phones and personal computers (PCs). Accordingly, communication with the reader/writer is established. In other words, the apparatus main body 30 is capable of transmitting and receiving various data to and from the reader/writer 1 via the IC card function provided by the communication processing unit 20.

However, as shown in FIG. 1, when the IC card function is provided to the electronic equipment, subsystem including an independent CPU, and a program memory, a nonvolatile memory and RAM, which are working areas accessible by the CPU is provided to provide the IC card function. Therefore, the communication processing unit 20 and the apparatus main body 30 in the information processing apparatus 10 have the same hardware structure. Such a structure causes a cost increase of the information processing apparatus, and prevents reduction in the size of the apparatus.

SUMMARY

An information processing apparatus, an information processing system, a method of processing information, and a computer program, are provided according to an embodiment which are capable of adding an IC card function to various types of electronic equipment, reducing the hardware resource, and reducing the size.

A first embodiment provides an information processing apparatus including a communication processing unit configured to communicate with an external communication device; and a data processing unit configured to communicate with the communication processing unit via a wire data communication path and to carry out data processing, wherein the communication processing unit includes a memory where data transmitted and received between a communication device and the data processing unit is temporarily stored, and a control unit configured to control data writing in and data reading from the memory, wherein, when a command packet received from the communication device is a data reading request, the control unit acquires data from the memory and transmits the data to the communication device, and wherein, when the command packet received from the communication device is a data writing request, the control unit stores data in the memory, acquires data from the memory in response to the request from the data processing unit, and outputs the data to the data processing unit.

In the information processing apparatus according to an embodiment of the present invention, the memory of the communication processing unit may be a first-in, first-out (FIFO) memory.

In the information processing apparatus according to an embodiment of the present invention, when the command packet received from the communication device is a data reading request and when data is not stored in the memory in the communication processing unit, the control unit of the communication processing unit may transmit a command reception notification to the data processing unit and may transfer a command corresponding to the request from the data processing unit.

In the information processing apparatus according to an embodiment of the present invention, when the command packet received from the communication device is a data writing request, the control unit of the communication processing unit may store a command, a data identifier corresponding to data to be written, and data, which are contained in the received packet, in the memory in the communication processing unit, may acquire the command, the data identifier corresponding to the data to be written, and the data, which are stored in the memory, in response to the request from the data processing unit, and may output the command, the data identifier, and the data to the data processing unit.

In the information processing apparatus according to an embodiment of the present invention, when the command packet received from the communication device is a data writing request, the control unit of the communication processing unit may store a data identifier corresponding to data to be written and data, which are contained in the received packet, in the memory in the communication processing unit, may acquire the data identifier corresponding to the data to be written and the data, which are stored in the memory, in response to the request from the data processing unit, and may output the data identifier and the data to the data processing unit.

In the information processing apparatus according to an embodiment of the present invention, when the command packet received from the communication device is a data writing request, the control unit of the communication processing unit may store data contained in the received packet in the memory in the communication processing unit, may acquire the data stored in the memory in response to the request from the data processing unit, and may output the data to the data processing unit.

In the information processing apparatus according to an embodiment of the present invention, the control unit of the communication processing unit may transfer the command packet received from the communication device to the data processing unit, without processing the command packet.

In the information processing apparatus according to an embodiment of the present invention, the control unit of the communication processing unit may carry out packet grammar check for packet investigation on the command packet received from the communication device.

In the information processing apparatus according to an embodiment of the present invention, the control unit of the communication processing unit may apply an error check code set for the command packet received from the communication device to carrying out error check.

In the information processing apparatus according to an embodiment of the present invention, the control unit of the communication processing unit may determine whether the command packet received from the communication device is a data writing request or a data reading request and may notify the data processing unit about the type of the received command.

In the information processing apparatus according to an embodiment of the present invention, the communication device may be a reader/writer, and the communication processing unit may receive a command packet from the reader/writer.

A second embodiment of the present invention provides an information processing system including a communication device configured to carry out wireless communication; and an information processing apparatus configured to carry out wireless communication, wherein the information processing apparatus includes a communication processing unit configured to carry out wireless communication with the communication device, and a data processing unit configured to communicate with the communication processing unit via a wire data communication path and to carry out data processing, wherein the communication processing unit includes a memory where data transmitted and received between the communication device and the data processing unit is temporarily stored, and a control unit configured to control data writing in and data reading from the memory, wherein, when a command packet received from the communication device is a data reading request, the control unit acquires data from the memory and transmits the data to the communication device, and wherein, when the command packet received from the communication device is a data writing request, the control unit stores data in the memory, acquires the data from the memory in response to the request from the data processing unit, and outputs the data to the data processing unit.

A third embodiment of the present invention provides a method of processing information carried out at an information processing apparatus including a communication processing unit configured to communicate with an external communication device, and a data processing unit configured to communicate with the communication processing unit via a wire data communication path and to carry out data processing, the method including the steps of acquiring data from a memory in the communication processing unit and transmitting the data to the communication device by a control unit of the communication processing unit when a command received from the communication device is a data reading request, and storing data in the memory, acquiring the data from the memory in response to a request from the data processing unit, and outputting the data to the data processing unit by the control unit of the communication processing unit when the command packet from the communication device is a data writing request.

A fourth embodiment of the present invention provides a computer program instructing an information processing apparatus to carry out information processing, the information processing apparatus including a communication processing unit configured to carry out communication with an external communication device, and a data processing unit configured to communicate with the communication processing unit via a wire data communication path and to carry out data processing, the computer program including the steps of acquiring data from a memory in the communication processing unit and transmitting the data to the communication device by a control unit of the communication processing unit when a command received from the communication device is a data reading request, and storing data in the memory, acquiring the data from the memory in response to a request from the data processing unit, and outputting the data to the data processing unit by the control unit of the communication processing unit when the command packet received from the communication device is a data writing request.

The program according to an embodiment of the present invention is, for example, a computer program that can be provided through a storage medium and/or communication medium readable by a general-purpose computer capable of executing various program codes. By providing such a program in a format readable by a computer, processing according to the program is carried out on the computer system.

A "system" according to an embodiment is a logical assembly of a plurality of devices, and the devices having different structures are not necessarily provided in the same casing.

An embodiment provides an information processing apparatus including a communication processing unit configured to carry out communication with a communication device, such as a reader/writer; and a data processing unit configured to execute wire communication with the communication processing unit, wherein the communication processing unit includes a memory where data transmitted and received between a communication device and the data processing unit is temporarily stored, and wherein a control unit configured to control the data writing and data reading in and out the memory is provided. When the command received from the communication device is a data reading request, the control unit acquires data from the memory and transmits it to the communication device. When the command received from the communication device is a data writing request, the control unit stores data in the memory, acquires data from the memory in response to request from the data processing unit, and outputs the data. By using a FIFO memory to simplify the processing carried out by the communication processing unit, the hardware resource of the entire information processing apparatus can be reduced, the cost of the apparatus can be decreased, and the size of the apparatus can be reduced.

Additional features and advantages of the present invention are described in, and will be apparent from, the following Detailed Description and the figures.

BRIEF DESCRIPTION OF THE FIGURES

FIG. 6 illustrates an example packet configuration of a data writing request sent to a reader/writer.

FIG. 7 illustrates an example of writing data in a memory when the information processing apparatus according to an embodiment of the present invention receives a data writing request from a reader/writer.

DETAILED DESCRIPTION

An information processing apparatus, an information processing system, a method of processing information, and a computer program will be described below in detail with reference to the drawings according to an embodiment.

The present application in an embodiment reduces the hardware resource and size by providing configurations that adds an IC card function to various types of electronic equipment. An information processing apparatus according to an embodiment will be described with reference to FIG. 2.

Figure 1:
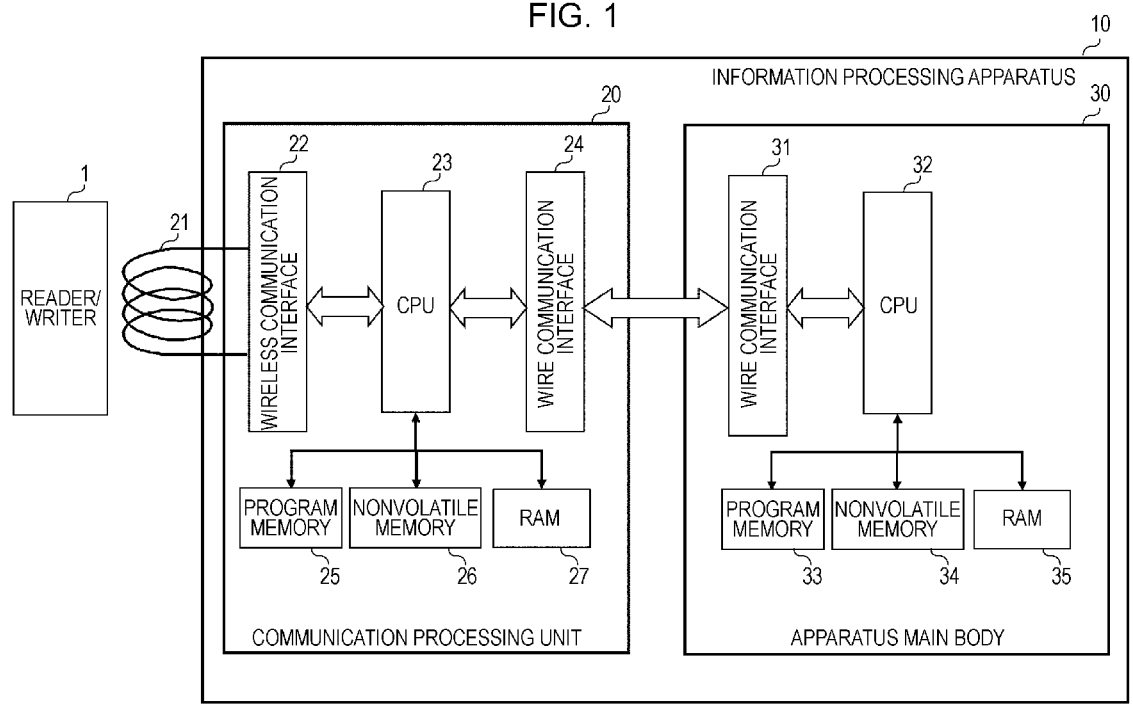
FIG. 1 illustrates an example configuration of an information processing unit including a communication processing unit that provides an IC function and an apparatus main body.
Figure 2:
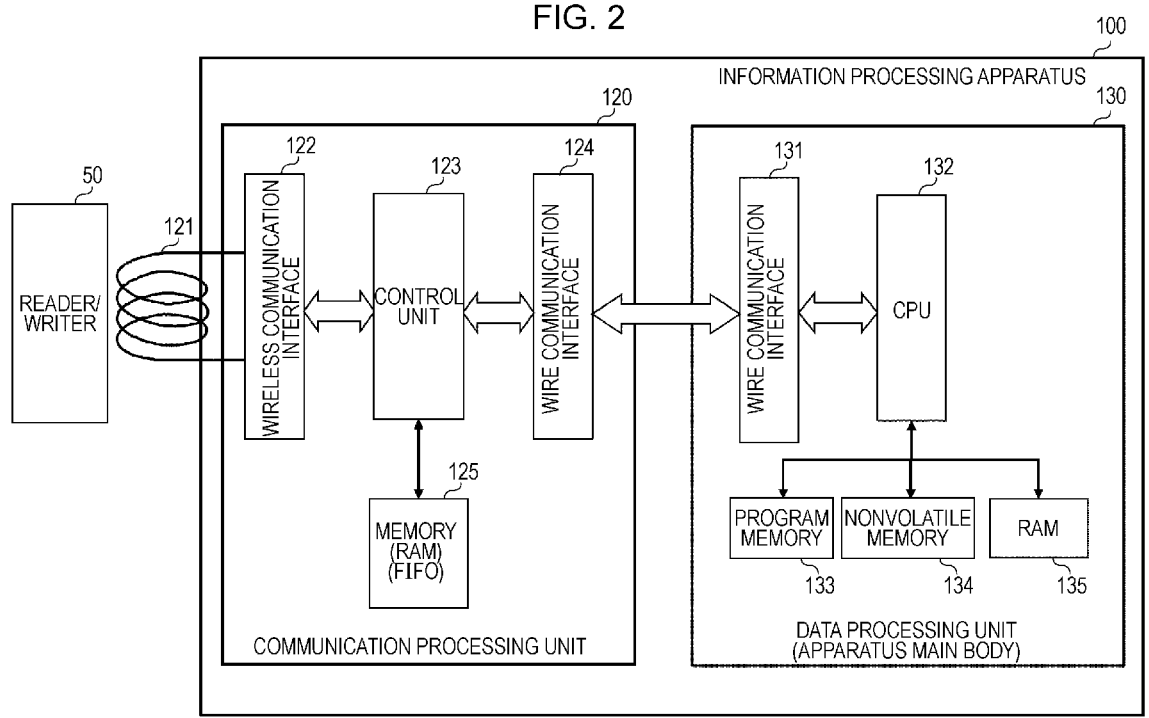
FIG. 2 illustrates an information processing apparatus according to an embodiment of the present invention, wherein the information processing unit including a communication processing unit that provides an IC function and an apparatus main body.

Similar to FIG. 1, FIG. 2 illustrates an information processing apparatus 100 configured of electronic equipment, such as a PC, and a reader/writer 50. The information processing apparatus 100 includes a communication processing unit 120 that provides an IC card function and a data processing unit 130, which is equivalent to an apparatus main body. The communication processing unit 120 carries out contactless communication with the reader/writer 50. The data processing unit 130 carries out various types of data processing in response to the function of the information processing apparatus 100.

The communication processing unit 120 includes an antenna 121 for carrying out wireless communication with the reader/writer 50, a wireless communication interface 122, a control unit 123 that controls the processing carried out in the communication processing unit 120, a wire communication interface 124 for carrying out wire communication with the data processing unit 130, and a memory 125 used as a buffer for communication data. The memory 125 is, for example, a first-in, first-out (FIFO) type RAM.

The data processing unit 130 includes a wire communication interface 131 for carrying out wire communication with the communication processing unit 120, a CPU 132 that controls the function of an information processing device in the data processing unit 130 and communication processing for the communication processing unit 120, a program memory 133 where programs to be executed by the CPU 132 and parameters are stored, a nonvolatile memory 134 where various data that is to be saved even when power is turned off is stored; and a RAM 135 that is a memory used as a work area for processing carrying out by the CPU 132.

The data transfer path between the communication processing unit 120 and the data processing unit 130 is set as a wire connecting path and a data transfer path employing a serial peripheral interface (SPI).

Through the configuration illustrated in FIG. 2, an IC card function is added to various types of electronic equipment, such as PCs and mobile terminals, and communication with a reader/writer is enabled. In other words, the data processing unit 130 is capable of transmitting and receiving various data to and from the reader/writer 50 via the communication processing unit 120.

The configuration of the information processing apparatus 100 according to an embodiment of the present invention, which is shown in FIG. 2, can be understood in comparison with the configuration of the information processing apparatus 10 described with reference to FIG. 1, the communication processing unit 120 of the information processing apparatus 100 according to an embodiment of the present invention, which is shown in FIG. 2, can be understood as having a simplified configuration in comparison of the communication processing unit 20, which is shown in FIG. 1.

The information processing apparatus 100 according to an embodiment of the present invention, which is shown in FIG. 2, differs from the communication processing unit 20, which is shown in FIG. 1, in the following embodiments:

(a) the communication processing unit 120 has a control unit 123 that is less powerful than the CPU 123 of the communication processing unit 20, which is shown in FIG. 1;

(b) the communication processing unit 120 does not have the program memory included in the communication processing unit 20, which is shown in FIG. 1;

(c) the communication processing unit 120 does not have a nonvolatile memory included in the communication processing unit 20, which is shown in FIG. 1;

(d) the communication processing unit 120 has a FIFO type RAM instead of the RAM included in the communication processing unit 20, which is shown in FIG. 1.

The program memory and the nonvolatile memory of the communication processing unit 120, which is shown in FIG. 2, may have a memory capacity smaller than the memory capacities of those included in the communication processing unit 20, which is shown in FIG. 1.

In this way, the configuration of the communication processing unit 120 of the information processing apparatus 100 shown in FIG. 2 is simplified. The control unit 123 of the communication processing unit 120 is set as a control logic for executing only simple processes according to a specific sequence. Details of the content of processing carried out by the control unit 123 are described below.

The control unit 123 of the communication processing unit 120 does not carry out complicated calculations, such as calculations on packets received from the reader/writer 50 and generation of transmission packets. Such calculations are carried out by the CPU 132 of the data processing unit 130. The control unit 123 of the communication processing unit 120 carries out FIFO control, such as data writing and reading using the memory 125, and direction control of the transmitted and received data. By employing such a configuration, the size of the circuit can be decreased and costs can be lowered.

In the configuration shown in FIG. 1, a data reading command from the reader/writer 50 defines the reading processing of the memory 125 of the communication processing unit 120. Similarly, a data write command from the reader/writer 50 defines the write processing of the memory 125 of the communication processing unit 120.

In a configuration according to an embodiment of the present invention, the control unit 123 of the communication processing unit 120 does not decode an address, which is an identifier corresponding to data associated with the read processing and the write processing. The address is transmitted to the data processing unit 130 when necessary and interpreted at the CPU 132 of the CPU 132.

The processing sequence when a data read out processing (reading) request is issued at the reader/writer 50 will be described with reference to FIGS. 3 and 4.

Figure 3:
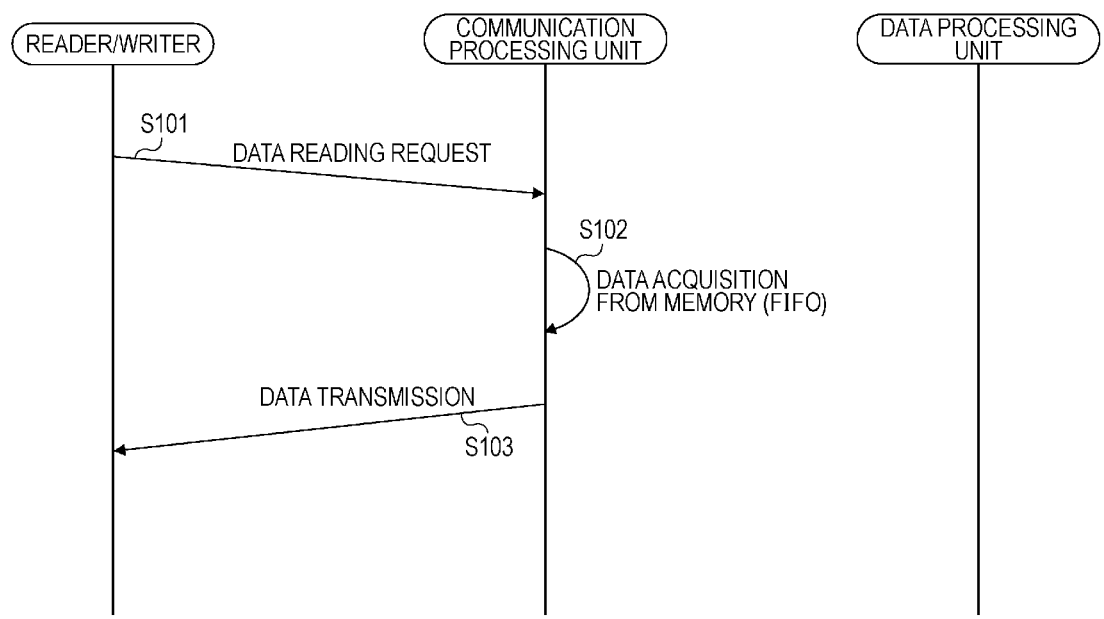
FIG. 3 illustrates an example processing sequence for when the information processing apparatus according to an embodiment of the present invention receives a data reading request from a reader/writer.
Figure 4:
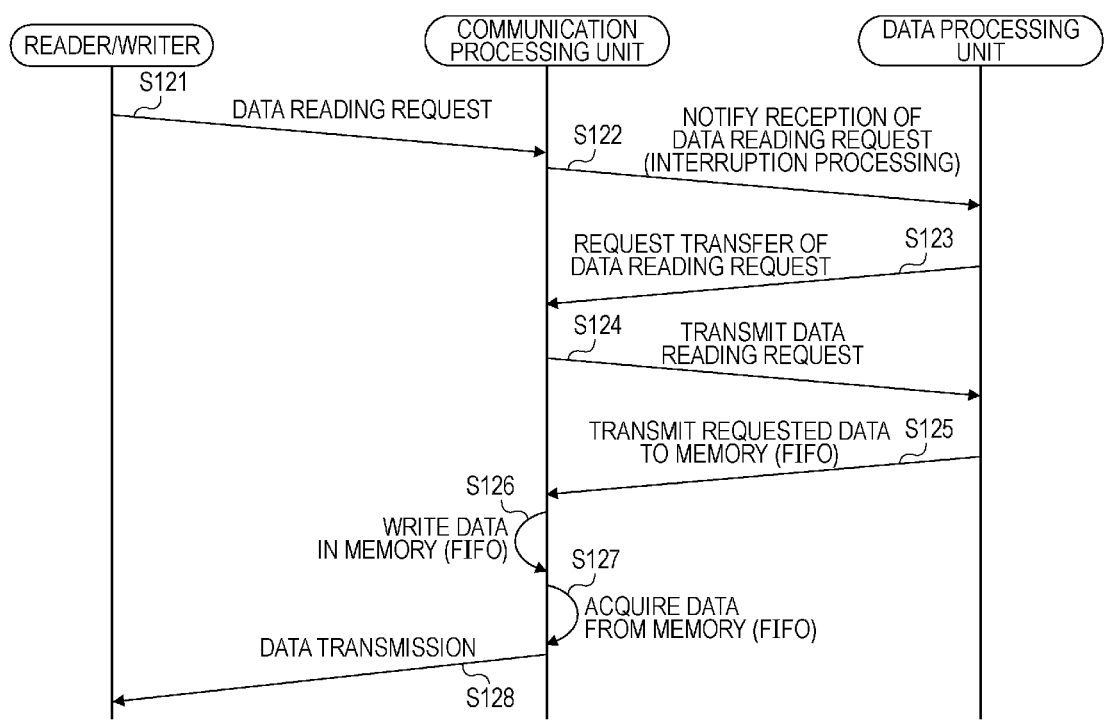
FIG. 4 illustrates an example processing sequence for when the information processing apparatus according to an embodiment of the present invention receives a data reading request from a reader/writer.

FIG. 3 illustrates a read processing sequence when data exists in the memory 125 of the communication processing unit 120.

In Step S101, the reader/writer 50 transmits a data reading request to the communication processing unit 120.

Next, in Step S102, the control unit 123 of the communication processing unit 120 sequentially acquires data stored in the memory 125 in response to the reading request. The memory 125 is a FIFO type memory and data is sequentially acquired by a first-in, first-out procedure.

Next, in Step S103, the communication processing unit 120 transmits data acquired from the memory 125 to the reader/writer 50.

Next, the read processing sequence for when data does not exist in the memory 125 of the communication processing unit 120 during the data read processing (reading) of the reader/writer 50 will be described with reference to FIG. 4.

First, in Step S121, the reader/writer 50 transmits a data reading request to the communication processing unit 120.

Next, in Step S122, the control unit 123 of the communication processing unit 120 transmits an interruption to the command reception, which indicates that the reading request to the CPU 132 of the data processing unit 130 is received.

In Step S123, the CPU 132 of the data processing unit 130 requests command transfer to the control unit 123 of the communication processing unit 120. In Step S124, the control unit 123 of the communication processing unit 120 transmits the reception command from the reader/writer 50 to the data processing unit 130 via the wire communication interface.

In Step S125, the CPU 132 of the data processing unit 130 analyzes the output command from the reader/writer 50 transferred from the control unit 123 of the communication processing unit 120. Through this command analysis, the data corresponding to the reading request is determined on the basis of a request data identifier (such as an address) contained in the command. The CPU 132 retrieves the determined reading request data from the nonvolatile memory 34 in the data processing unit 130 and transmits it to the communication processing unit 120 via the wire interface.

In Step S126, the control unit 123 of the communication processing unit 120 sequentially stores the data received from the data processing unit 130 in the memory 125.

Next, in Step S127, the control unit 123 of the communication processing unit 120 sequentially acquires the data stored in the memory 125. The memory 125 is a FIFO type memory and data is sequentially acquired through a first-in, first-out procedure.

Finally, in Step S128, the communication processing unit 120 transmits the data acquired from the memory 125 to the reader/writer 50.

The data transmission from the communication processing unit 120 to the reader/writer 50 in Step S128 may be carried out after being in stand-by until the subsequent reading request from the reader/writer 50 is received.

As described with reference to FIGS. 3 and 4, when the communication processing unit 120 receives the data reading request from the reader/writer 50, communication with the data processing unit 130 is not carried out and data is sequentially acquired from the memory 125 and transmitted to the reader/writer 50 when the data is stored in the memory 125 in the communication processing unit 120.

When data is not stored in the memory 125 in the communication processing unit 120 upon reception of the data reading request from the reader/writer 50, communication with the data processing unit 130 is carried out, data received from the data processing unit 130 is written in the memory 125, and then data is sequentially acquired from the memory 125 and transmitted to the reader/writer 50.

Figure 5:
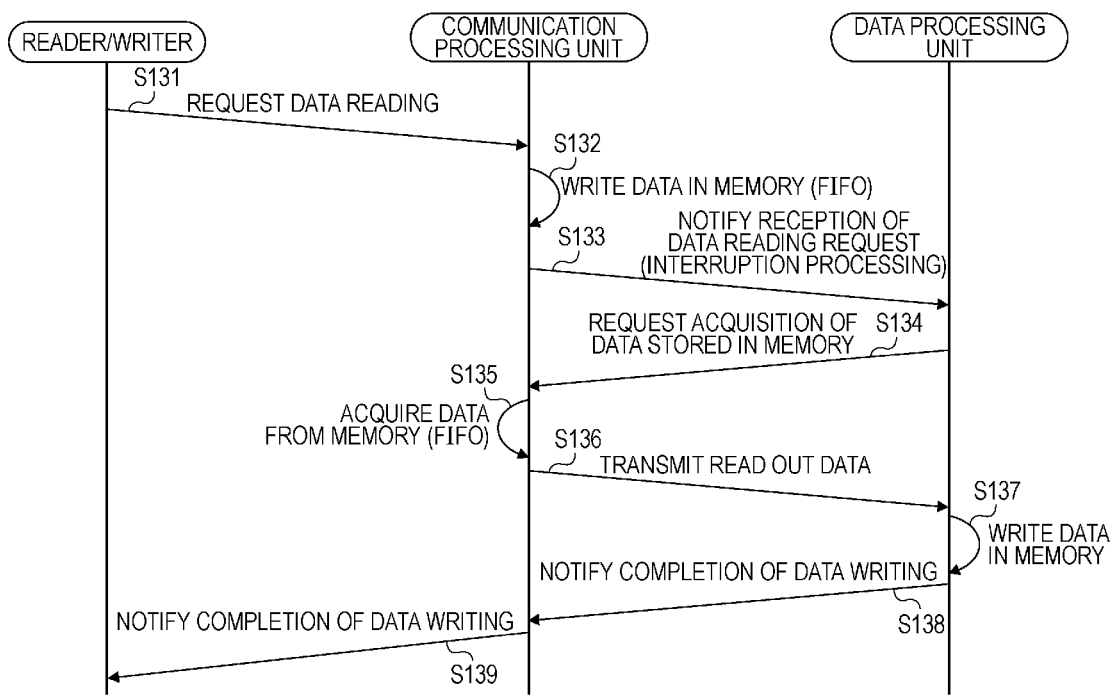
FIG. 5 illustrates an example processing sequence for when the information processing apparatus according to an embodiment of the present invention receives a data writing request from a reader/writer.

Next, a processing sequence for when a data write (writing) request is issued from the reader/writer 50 will be described with reference to FIG. 5.

First, in Step S131, the reader/writer 50 transmits a data writing request to the communication processing unit 120.

An example configuration of such a data writing request packet is illustrated in FIG. 6. As shown in FIG. 6, the data writing request contains identification information of commands and transmission and reception devices, a header (head) containing transmission data information, a write command (writing), a plurality of paired data sets of identification information (address) of the data to be written and the data to be written, and a footer containing error check codes, such as cyclic redundancy check (CRC).

Upon reception of the data write packet shown in FIG. 6, the control unit 123 of the communication processing unit 120 sequentially stores the data received from the reader/writer 50 in the memory 125 in Step S132. For example, as shown in the memory (FIFO) 125 in the communication processing unit 120 in FIG. 7B, the command (writing) contained in the data writing request packet and the plurality of paired data sets of identification information (address) of data to be written and the data to be written are written according to the data series of the packet.

Next, in Step S133, the control unit 123 of the communication processing unit 120 transmits an interruption to the command reception, which indicates that the reading request from the reader/writer 50 to the CPU 132 of the data processing unit 130 is received.

Next, in Step S134, the CPU 132 of the data processing unit 130 requests the transfer of the data written in the memory (FIFO) 125 of the communication processing unit 120 to the control unit 123 of the communication processing unit 120.

In Step S135, the control unit 123 of the communication processing unit 120 sequentially acquires the data stored in the memory 125. In Step S136, the acquired data is output to the data processing unit 130. Such transferred data is the data written in the memory (FIFO) 125 of the communication processing unit 120 shown in FIG. 7B.

In other words, the data "command (write)", "address 0", "data 0", "address 1", "data 1"... are sequentially output to the data processing unit 130.

The CPU 132 of the data processing unit 130 sequentially acquires the data in Step S137 and writes the received data in the nonvolatile memory 134. The data "address 0", "data 0", "address 1", "data 1", ... stored in the nonvolatile memory 134 of the data processing unit 130 shown in FIG. 7B are recorded. The addresses are recorded in the memory as identification information of the data.

When the data writing is completed, the CPU 132 of the data processing unit 130 sends a data writing completion notification to the communication processing unit 120 in Step S138.

Finally, in Step S139, the control unit 123 of the communication processing unit 120 sends a processing completion notification to the reader/writer 50.

The processing-completion notification in Step S139 from the communication processing unit 120 to the reader/writer 50 may be carried out after being in stand-by until the processing-completion transmission request from the reader/writer 50 is received.

It is satisfactory so long as the data storage capacity of the memory (FIFO) 125 in the communication processing unit 120 is a capacity capable of recording one packet of data transmitted from the reader/writer 50. So long as the capacity is sufficient for one packet, when the communication processing unit 120 receives packets from the reader/writer 50, communication with the data processing unit 130 can be started after all sets of packet data are written in the memory.

In the processing example described above, the control unit 123 of the communication processing unit 120 carries out the following processes:

(A) In response to the data reading request from the reader/writer:

(a1) command of a packet received from the reader/writer is determined;

(a2) command reception to the data processing unit is notified;

(a3) command is transferred in response to the command transfer request from the data processing unit;

(a4) data is received from the data processing unit and data is written in the memory 125; and (a5) data is acquired from the memory 125 and output to the reader/writer.

(B) In response to the data writing request from the reader/writer:

(b1) command of a packet received from the reader/writer is determined;

(b2) the data received from the reader/writer is written in the memory 125;

(b3) command reception is notified to the data processing data processing unit;

(b4) data is received from the memory 125 in response to the data transfer request from the data processing unit and output to the data processing unit; and (b5) data-writing-processing completion notification from the data processing unit is received and processing completion notification to the reader/writer is transmitted.

In this way, the control unit 123 of the communication processing unit 120 does not carry out high-level processing, such as analysis of data identifiers (addresses) contained in a command, when actual data recording and reading is performed. The memory grounded to the communication processing unit 120 is a FIFO type memory. During data writing, only sequential data writing is carried out according to the order of the received packets. During data read out, only transmission is carried out by reading out the data in the order the data was written. Accordingly, memory access can be carried out through an extremely simple process.

By employing such a configuration, a less powerful control unit 123 can be used for the communication processing unit 120. Moreover, for the program memory and nonvolatile memory in the communication processing unit, which is described above with reference to FIG. 1, the numbers can be reduced and/or the capacities can be reduced.

As described above, the communication processing unit 120 of the information processing apparatus 100 according to an embodiment of the present invention includes the memory (FIFO) 125 where data transmitted and received between the reader/writer 50, which is an external communication device, and the data processing unit 130 is temporarily stored. Furthermore, the communication processing unit 120 includes the control unit 123 that controls the data writing to and data reading from the memory 125.

When the command packet received from the reader/writer 50 is a data reading request, the control unit 123 transmits data acquired from the memory 125 to the reader/writer 50. When the command packet is a data writing request, the control unit 123 stores the data in the memory 125 in response to the request from the data processing unit 130, acquires data from the memory 125, and outputs the data to the data processing unit 130.

When the command packet received from the reader/writer 50 is a data reading request and when data is not stored in the memory 125 in the communication processing unit 120, the control unit 123 of the communication processing unit 120 transmits a command reception notification to the data processing unit 130 and transfers the command in response to request from the data processing unit 130.

When the command packet received from the reader/writer 50 is a data writing request, the data recorded in the memory 125 and transferred to the data processing unit 130 by the control unit 123 of the communication processing unit 120 may be any one of the following:

(a) the command contained in the received packet and data identifier and data corresponding to the data to be written; or (b) the data identifier and data corresponding to the data to be written contained in the received packet.

When the data is (a), the CPU 132 of the data processing unit 130 interprets the command.

When the data is (b), the control unit 123 of the communication processing unit 120 interprets the command. In such a case, the control unit 123 determines whether the command packet received from the reader/writer 50 is a data writing request or a data reading request and notifies the data processing unit 130 about the type of the received command.

The processing carried out at the control unit 123 of the communication processing unit 120 and the processing carried out at the CPU 132 of the data processing unit 130 may be carried out in various ways.

Specifically, for example, when a command packet is received from the reader/writer, the control unit 123 of the communication processing unit 120 may process the packet as follows:

(A) the header and footer contained in the packet received from the reader/writer are read, the packet grammar check, such as error check of packet by CRC stored in the footer, is carried out to investigate the integrity of the received packet, and a packet reception notification is output to the data processing unit;

(B) in addition to the packet grammar check of the above-described (A), the command is interpret, and the packet reception notification containing the command type is output to the data processing unit; or (C) only the packet reception notification is sent to the data processing unit, without processing the packet received from the reader/writer.

The control unit 123 of the communication processing unit 120 is preset to carry out, for example, one of the above-described (A) to (C). The processing carried out by the CPU 132 of the data processing unit 130 is changed in response to the setting of (A) to (C).

In any one of the settings (A) to (C), the control unit of the communication processing unit 120 may be significantly less powerful than that of the CPU provided on a typical IC card. Thus, the cost of hardware can be reduced, and the size of the device can be decreased.

The minimum amount of processing carried out at the control unit 123 of the communication processing unit 120 is the wireless communication with the reader/writer, the wire communication with the data processing unit, storing and reading data in and from the memory (FIFO) 125.

The processing of the packet may be carried out in various ways as described above. It is preferable, however, to select the appropriate setting according to the cost of the information processing apparatus and the size of the apparatus.

Embodiments of the present invention have been described above. It is obvious, however, that one skilled in the art may employ various modifications and substitutions within the scope of the invention. In other words, the present invention is not limited to the embodiments described above. The gist of the invention is to be understood through the claims.

The series of processing may be executed by hardware, software, or a combination of both. To carry out the processing with software, a program recording a processing sequence is installed in a memory in a computer built in specialized hardware and is executed, or the program is installed in a computer capable of carrying out various types of processing and is executed. For example, the program can be recorded in a recording medium in advance. In addition to installing the program from a recording medium to a computer, the program may be received via a network, such as a local area network (LAN) or the Internet, and may be installed to a recording medium, such as an embedded hard disk.

The various types of processing described above may be executed time-sequentially in the described order or may be simultaneously or individually executed according to the processing power of the device used for processing. The system according to an embodiment of the present invention is a logical assembly of a plurality of devices, and the devices having different structures are not necessarily provided in the same casing.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention is claimed as follows:

1. An information processing apparatus comprising:
 a communication processing unit configured to communicate with an external communication device; and
 a data processing unit configured to communicate with the communication processing unit via a wired data communication path, and configured to interpret address information received from the external communication device;
 wherein the communication processing unit comprises:
  a memory where data transmitted and received between the external communication device and the data processing unit is temporarily stored, and
  a control unit configured to control data writing in and data reading from the memory, perform an error check process by a code included in a received data from the external communication device, and transmit the address information received from the external communication device to the data processing unit without interpreting the address information.

2. The information processing apparatus according to claim 1,
 wherein the control unit outputs a reception notification of data from the external communication device to the data processing unit after the error check process.

3. The information processing apparatus according to claim 2,
 wherein the control unit determines a command request included in the received data.

4. The information processing apparatus according to claim 3,
 wherein, when the command request received from the external communication device is a data reading request, the control unit acquires data from the memory and transmits the data to the external communication device.

5. The information processing apparatus according to claim 1,
 wherein, when a command request received from the external communication device is a data reading request, the control unit is configured to:
 (a) perform the error check process,
 (b) output a reception notification of data from the external communication device to the data processing unit,
 (c) receive a requested data from the data processing apparatus,
 (d) store the requested data into the memory,
 (e) acquire data from the memory, and
 (f) transmit the data to the external communication device.

6. The information processing apparatus according to claim 3, wherein, when the command request received from the external communication device is a data writing request, the control unit stores data in the memory, acquires data from the memory in response to a request from the data processing unit, and outputs the data to the data processing unit.

7. The information processing apparatus according to claim 1,
wherein, when a command request received from the external communication device is a data writing request, the control unit is configured to:
(a) perform the error check process,
(b) store data in the memory,
(c) acquire data from the memory,
(d) transmit the data to the data processing unit,
(e) receive a completion notification of data writing by the data processing unit from the data processing unit, and
(f) output a completion notification of data writing by the data processing requested data to the external communication device.

8. An information processing method performed by an apparatus including a communication processing unit configured to communicate with an external communication device, a data processing unit configured to communicate with the communication processing unit via a wired data communication path, and a memory where data transmitted and received between a communication device and the data processing unit is temporarily stored, the method comprising:
controlling data writing in and data reading from the memory;
performing an error check process by a code included in a received data from the external communication device;
transmitting, by the communication processing unit, address information received from the external communication device to the data processing unit without interpreting the address information; and
interpreting the address information by the data processing unit.

9. The information processing method according to claim 8, further comprising:
outputting a reception notification of data from the external communication device to the data processing unit after the error check process.

10. The information processing method according to claim 9, further comprising:
determining a command request included in the received data.

11. The information processing method according to claim 10, further comprising:
acquiring data from the memory and transmitting the data to the external communication device when the command request received from the external communication device is a data reading request.

12. The information processing method according to claim 8,
wherein, when a command request received from the external communication device is a data reading request, the method further comprises:
performing the error check process;
outputting a reception notification of data from the external communication device to the data processing unit;
receiving a requested data from the data processing apparatus;
storing the requested data into the memory;
acquiring data from the memory; and
transmitting the data to the external communication device.

13. The information processing method according to claim 10,
wherein, when the command request received from the external communication device is a data writing request, the method further comprises:
storing data in the memory;
acquiring data from the memory in response to a request from the data processing unit; and
outputting the data to the data processing unit.

14. The information processing method according to claim 8,
wherein, when a command request received from the external communication device is a data writing request, the method further comprises:
performing the error check process,
storing data in the memory,
acquiring data from the memory,
transmitting the data to the data processing unit,
receiving a completion notification of data writing by the data processing unit from the data processing unit, and
outputting a completion notification of data writing by the data processing requested data to the external communication device.

* * * * *